(12) United States Patent
Goodfellow (10) Patent No.: US 6,826,863 B1
(45) Date of Patent: Dec. 7, 2004

(54) COMBINATION VIDEO MONITOR AND DETACHABLE PICTURE FRAME

(75) Inventor: Anthony E. B. Goodfellow, Long Beach, CA (US)

(73) Assignee: Pacific Digital Corporation, Irvine, CA (US)

( * ) Notice: Subject to any disclaimer, the term of this patent is extended or adjusted under 35 U.S.C. 154(b) by 0 days.

(21) Appl. No.: 10/659,446

(22) Filed: Sep. 9, 2003

(51) Int. Cl.[7] .............................. G06F 1/16; A47G 1/06
(52) U.S. Cl. ........................ 40/725; 40/800; 248/918; 361/681
(58) Field of Search ................. 40/725, 800; 361/710, 361/681; 345/104, 156, 168, 901–905, 87; 349/1, 2, 11, 12; 248/917–927; 348/180, 184, 325

(56) References Cited

U.S. PATENT DOCUMENTS

| | | | | |
|---|---|---|---|---|
| 4,353,327 A | * | 10/1982 | Shroyer ..................... | 119/257 |
| 5,850,998 A | * | 12/1998 | Parsey et al. .......... | 248/223.21 |
| 5,881,986 A | * | 3/1999 | Hegarty .................... | 248/442.2 |
| 6,520,607 B2 | * | 2/2003 | Pfaff .......................... | 312/204 |
| 2001/0046115 A1 | * | 11/2001 | Genicevitch ................ | 361/682 |
| 2004/0150943 A1 | * | 8/2004 | Rock .......................... | 361/681 |

* cited by examiner

*Primary Examiner*—Cassandra Davis
(74) *Attorney, Agent, or Firm*—Morland C. Fischer (57) ABSTRACT

A standard picture frame detachably connected to a video monitor of the kind having a digital display to receive and display photographic images that are downloaded from a compatible image source so as to enhance the aesthetic appearance of the monitor to match the surroundings in which the monitor will be stationed. In the assembled relationship, the picture frame is attached to the front of the monitor so as to lie in surrounding engagement with a picture frame mount, whereby the digital display is visible through the central window of the frame. In a first embodiment, a pair of slidable locking latches project outwardly and in opposite direction from the monitor for receipt by the existing peripheral groove formed in the picture frame. In a second embodiment, a pivotal locking latch and a stationary locking tab project outwardly and in opposite directions from the monitor for receipt by the existing peripheral groove in the frame.

14 Claims, 8 Drawing Sheets

COMBINATION VIDEO MONITOR AND DETACHABLE PICTURE FRAME

BACKGROUND OF THE INVENTION

1. Field of the Invention

This invention relates to a video monitor, such as that used to receive and display photographic images that are downloaded from a compatible image source, and to a standard picture frame that is detachably connected to the front of the video monitor to enhance the aesthetic appearance thereof so as to match the surroundings in which the monitor will be stationed.

2. Background Art

Video monitors are well known computer peripherals at which computer generated images, and the like, can be displayed. In one case, a video monitor can be interfaced with a personal computer, a digital camera or a suitable memory card reader to display digital photographic images. Such a video monitor would often be placed on a desk or a shelf in a home or office. However, the typical monitor is manufactured from plastic which is often drab in appearance. Such a drab appearance may not blend well with the motif in which the home or office has been decorated.

Instead of having the original appearance of the monitor stand out, it may be desirable to enhance the appearance and/or disguise the monitor so as to make it look like a standard picture frame. Accordingly, the photographic images being displayed by the monitor would look like photographs or pictures of the kind that are usually surrounded by a picture frame. In this way, the aesthetics of the monitor can be changed to better match the surroundings of the home or office in which the monitor will be used.

SUMMARY OF THE INVENTION

A video monitor is disclosed to which a standard picture frame can be detachably connected to improve the aesthetic appearance of the monitor so as to match the surroundings of a home or office in which the monitor will be stationed. The standard picture frame to be detachably connected to the monitor is of the kind having a rectangular border that surrounds a central open window through which a photograph would otherwise be visible. An existing peripheral groove within which the photograph would be retained is formed in the border so as to extend around the open window. The video monitor includes a hollow shell within which a conventional digital display is enclosed and a rectangular picture frame mount which projects outwardly from the front of the monitor to surround the display and accommodate the picture frame. In the assembled relationship, with the picture frame attached to the video monitor, the frame will lie in surrounding engagement with the picture frame mount at the front of the monitor, whereby the digital display will be visible through the central window of the picture frame.

According to a first embodiment, a pair of locking latches are slidable through the hollow shell at opposite sides of the picture frame mount at the front of the video monitor. The latches are disposed so as to receive a manual pushing force thereagainst to cause the latches to slide through the hollow shell of the video monitor and towards the picture frame from an unlocked position, where the frame is detached from the monitor, to a locked position, where the frame and the monitor are attached to one another. In the locked position, locking fingers that extend from the locking latches are moved through respective openings in opposite sides of the picture frame mount for receipt by the existing peripheral groove in the border at opposite sides of the picture frame.

According to a second embodiment, a pair of stationary locking tabs project outwardly from the hollow shell of the video monitor through respective openings formed in one side of the picture frame mount. A pivotal locking latch is supported for rotation within the hollow shell at the opposite side of the picture frame mount. The stationary locking tabs projecting outwardly from the picture frame mount are aligned for receipt within the existing groove in the border at one side of the picture frame. The pivotal locking latch is disposed so as to receive a manual pushing force thereagainst to cause the latch to rotate within the hollow shell of the video monitor and towards the picture frame from an unlocked position, where the frame is detached from the monitor, to a locked position, where the frame and the monitor are attached to one another. In the locked position, a locking finger that extends from the pivotal locking latch is moved through an opening formed in the opposite side of the picture frame mount for receipt by the existing groove in the border at the opposite side of the picture frame.

DETAILED DESCRIPTION

Figure 1:
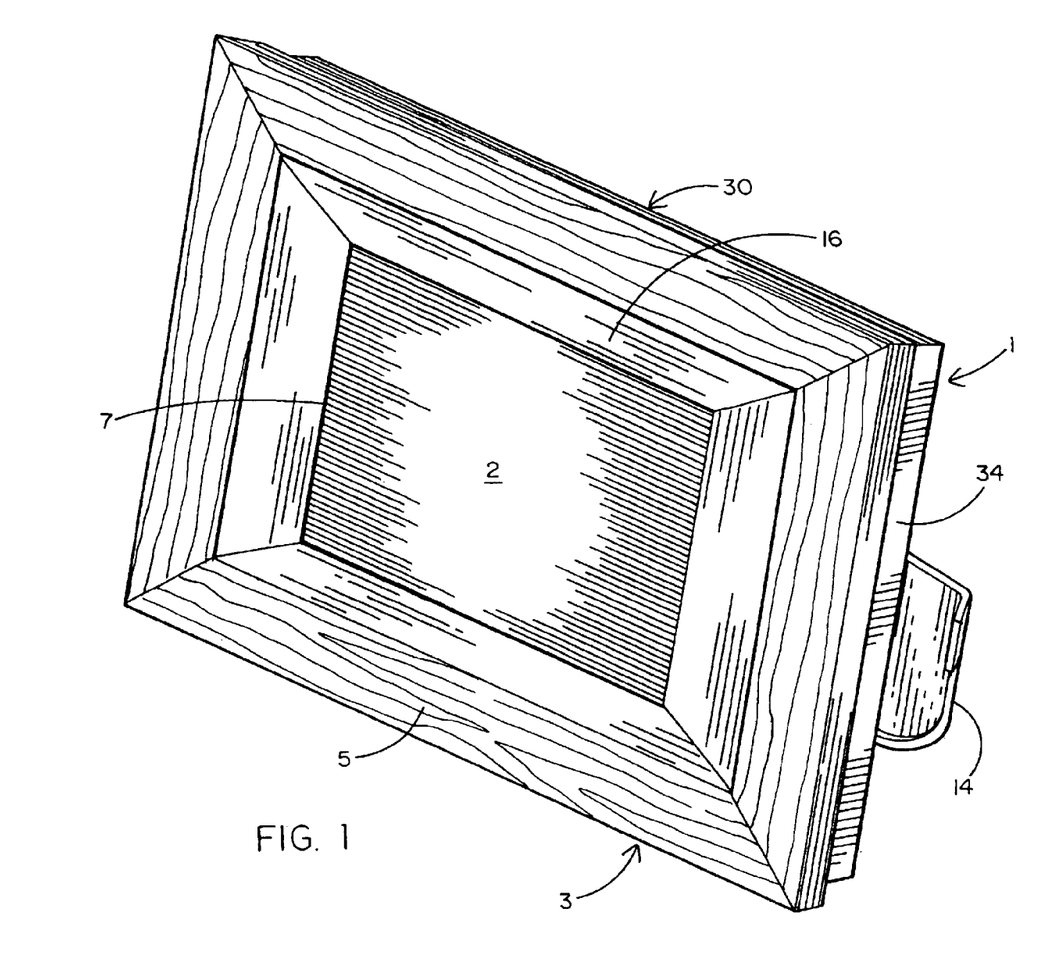
FIG. 1 shows a video monitor having a standard picture frame detachably connected to the front of the monitor in accordance with a first embodiment of this invention.
Figure 2:
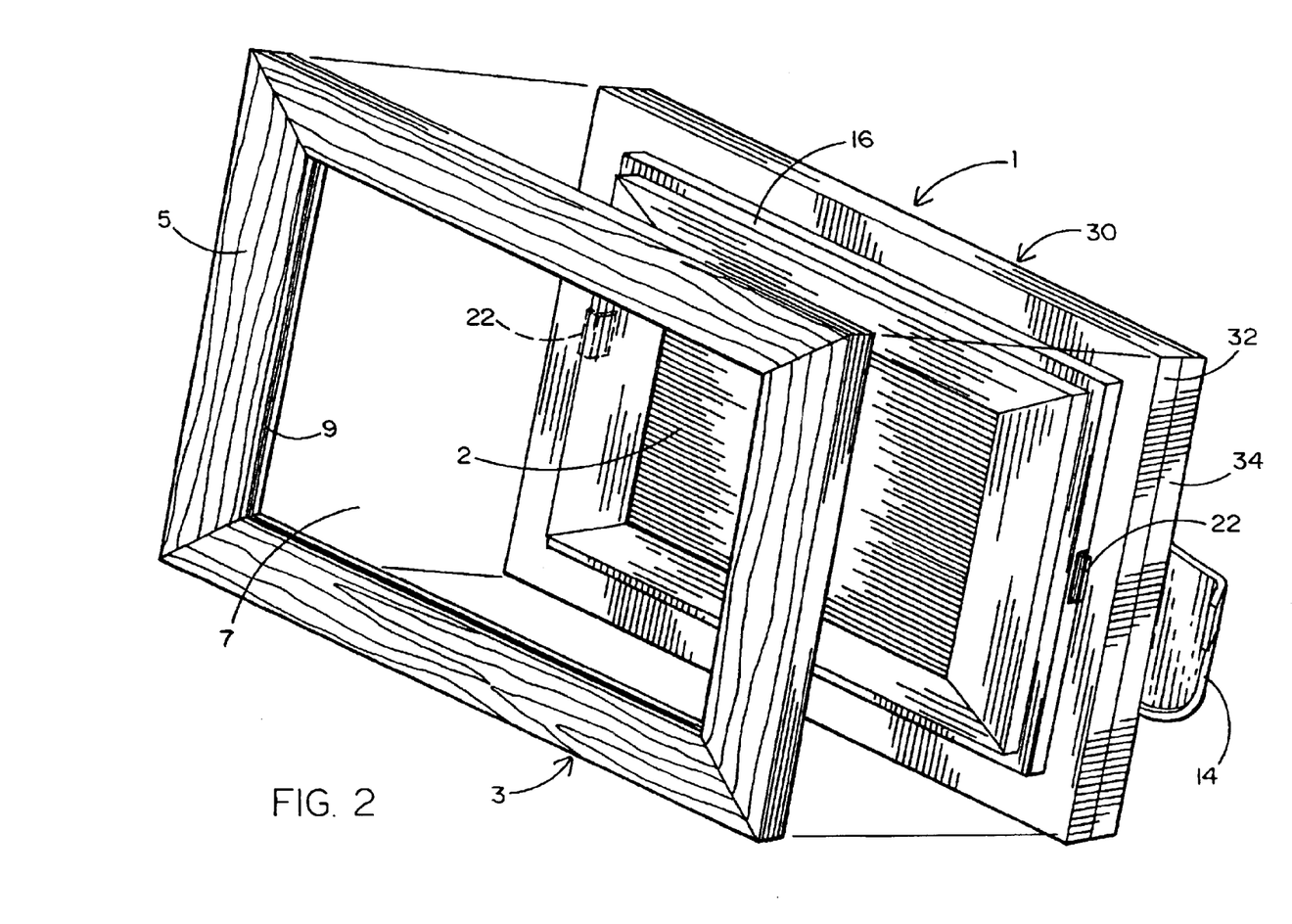
FIG. 2 is an exploded view of the video monitor and picture frame of FIG. 1 detached from one another.

A first embodiment for a video monitor to which a picture frame is detachably connected is described while referring to FIGS. 1 and 2 of the drawings. The video monitor 1 includes a hollow shell 30 having front and rear shell members 32 and 34 that enclose a commercially available digital display 2 of the type that is commonly interconnected with a computer, a digital camera, a memory card reader, and the like. By way of example only, the digital display 2 of the video monitor 1 may be a stand alone active matrix thin film transistor (TFT) display that uses conventional flat panel, LCD or plasma technologies. The display 2 can have a variety of different uses such as, for example, to receive and display photographic images that are downloaded from a compatible image source.

For purposes of aesthetics and to give the appearance that the image being shown on the digital display 2 of video monitor 1 is a printed photograph, the display 2 is surrounded by a frame 3. The frame 3 is a standard picture frame of the kind commonly used to enclose a standard photograph or picture. Thus, the frame 3 can have a texture and a color and be manufactured from a material (e.g., plastic, wood, metal, etc.) that is selected to match the environment in which the monitor 1 will be stationed. That is, the combination video monitor 1 and picture frame 3 can be located on a shelf or desktop in a home or office to blend in with the surroundings. To this end, a stand (designated 14 and best shown in FIG. 3) is pivotally connected to the rear shell member 34 at the back of video monitor 1 to enable the combination monitor 1 and frame 3 to rest on any flat surface in the manner of a usual picture frame. In this same regard, and as is best shown in FIG. 3, anchor holes 15 are formed in the rear shell member 34 at the back of video monitor 1 within which to receive a suitable anchor so as to enable the combination monitor 1 and frame 3 to be mounted on a wall.

As is best shown in FIG. 2, the picture frame 3 includes an outer (e.g., rectangular) border 5 having a central open area or window 7 through which the digital display 2 will be visible. The border 5 can have any one of a variety of sizes that is consistent with the size of a standard picture frame. A peripheral groove 9 that is common to most picture frames by which to retain a photograph is formed in the border 5 so as to run around the central window 7. As will soon be explained, the hollow shell 30 of the video monitor 1 carries a pair of slidable locking latches (designated 20 in FIGS. 4-6) having locking fingers 22 that are aligned for removable receipt within the existing peripheral groove 9 of picture frame 3, whereby the frame can be detachably connected to the front of the monitor 1 so as to surround the display 2.

A rectangular picture frame mount 16 projects outwardly from the front shell member 32 of the hollow shell 30 so as to surround the display 2 of video monitor 1. The dimensions of picture frame mount 16 are selected to correspond with the dimensions of the central window 7 of picture frame 3 so that frame 3 can be detachably connected to the front of monitor 1 in surrounding engagement with mount 16.

Figure 3:
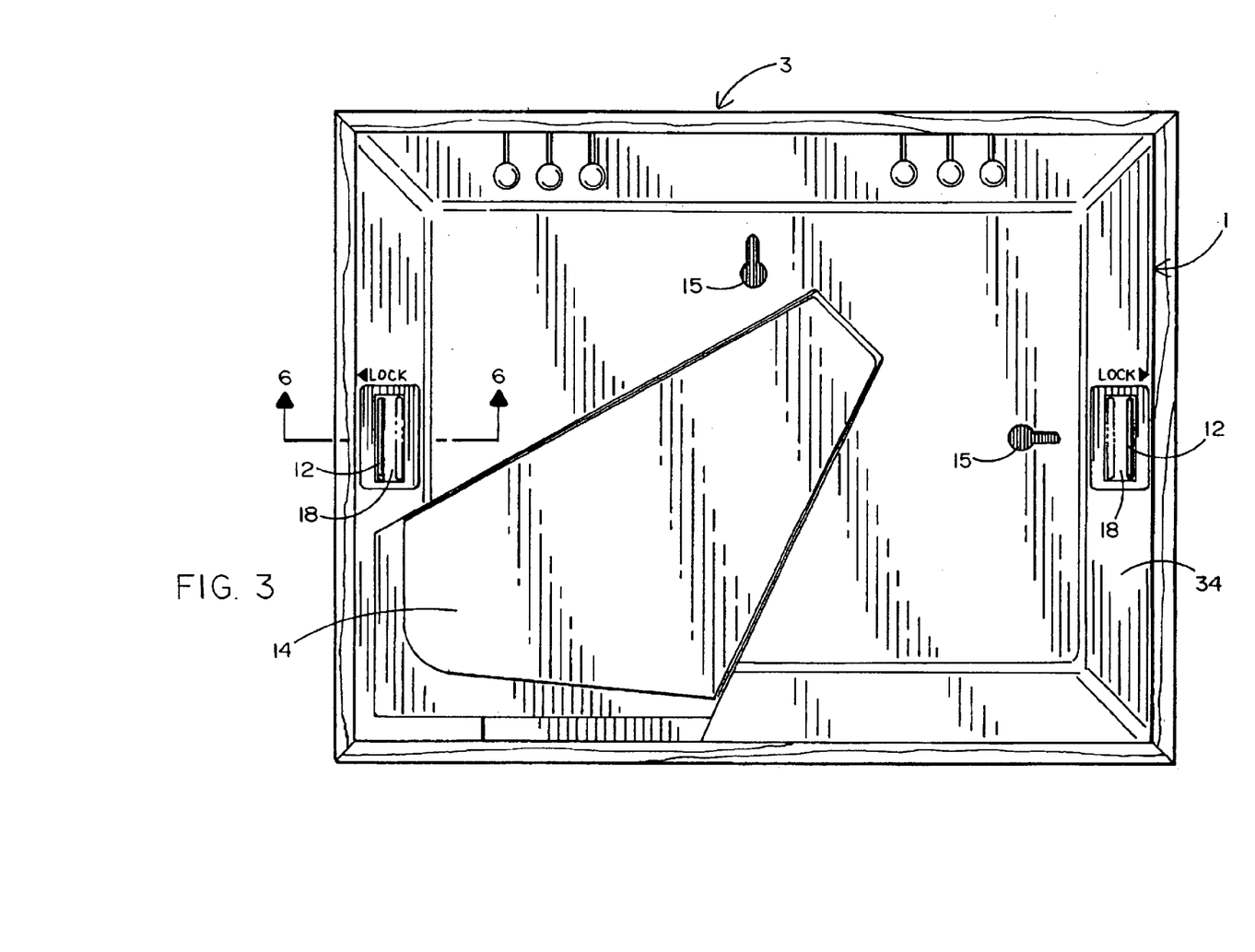
FIG. 3 is a rear view of the combination video monitor and picture frame of FIG. 1.

Referring to FIG. 3 of the drawings, the position of each of the slidable locking latches 20 (of FIGS. 4-6) relative to the picture frame 3 is selectively controlled by means of respective push tabs 12 that are manually accessible at the back of video monitor 1 via elongated slots 18 formed through the rear shell member 34. As will be explained when referring to FIGS. 4-6, a locking finger 22 and a push tab 12 are located at opposite ends of locking latch 20, the sliding movement of which enables the video monitor 1 and the picture frame 3 to be either connected together or detached from one another.

Figure 4:
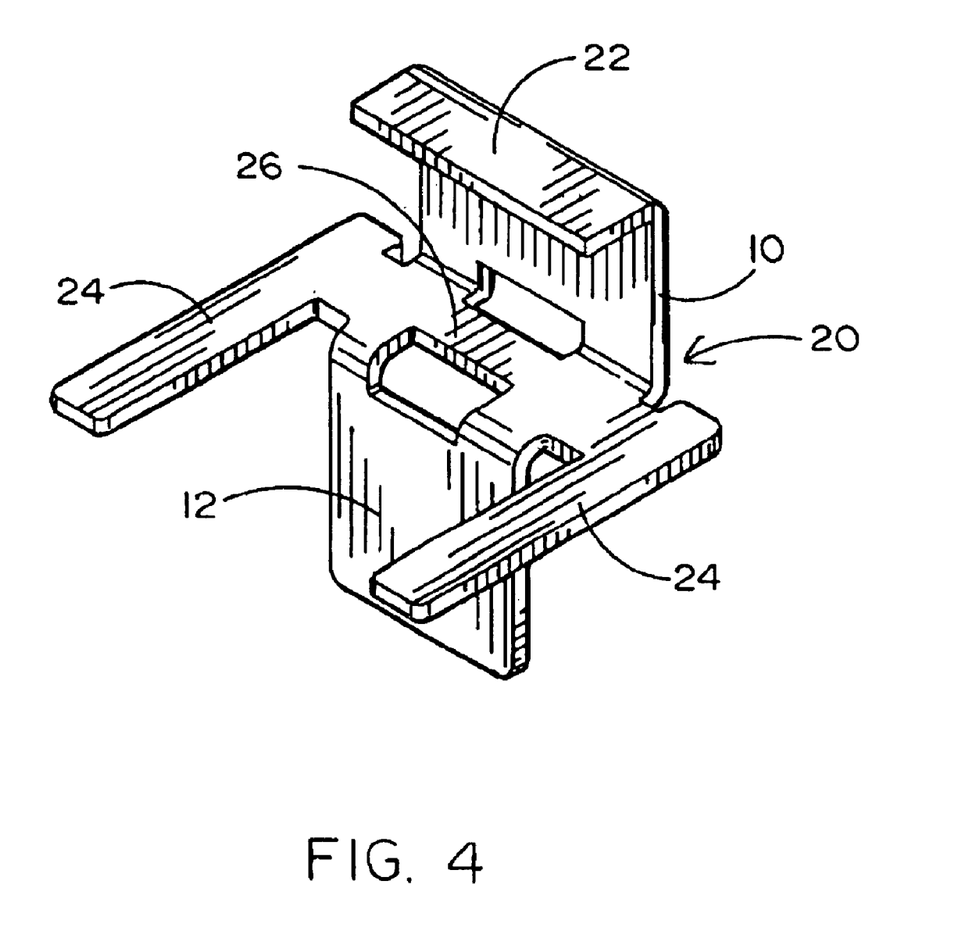
FIG. 4 is a perspective view of a slidable locking latch by which the picture frame is detachably connected to the video monitor.

FIG. 4 of the drawings shows one of the pair of sliding locking latches 20 that is carried by the hollow shell 30 of video monitor 1 so as to control the detachable connection of the picture frame 3 to the front of monitor 1 in order to surround the picture frame mount 16 which surrounds the display 2 (of FIGS. 1 and 2). A locking tab 10 is located at one end of the latch 20. The locking tab 10 includes the aforementioned locking finger 22 that is bent by about 90 degrees so as to be aligned for movement into locking engagement with the picture frame 3 by which the frame 3 and the video monitor 1 will be detachably connected together. As previously described, a push tab 12 is located at the opposite end of latch 20. The push tab 12 is sized and positioned (at the back of monitor 1) so as to receive a pushing force thereagainst whereby to cause a sliding displacement of the locking latch 20 within the hollow shell 30 of video monitor 1 and a corresponding movement of the locking finger 22 of locking tab 10 between locked and unlock positions relative to the picture frame 3.

A pair of sliding arms 24 project outwardly and in parallel alignment with one another from a seat 26 of locking latch 20. The seat 26 is located at the approximate midpoint of latch 20 and at the intersection of the opposing locking tab 10 and push tab 12. As will be described while referring to FIGS. 5 and 6, the sliding arms 24 and the seat 26 facilitate the sliding displacement of the latch 20 within the hollow shell 30 of video monitor 1 in response to a pushing force that is applied to the push tab 12 to cause the locking finger 22 of locking tab 10 to be moved between the locked and unlock positions relative to the picture frame 3.

Figure 5:
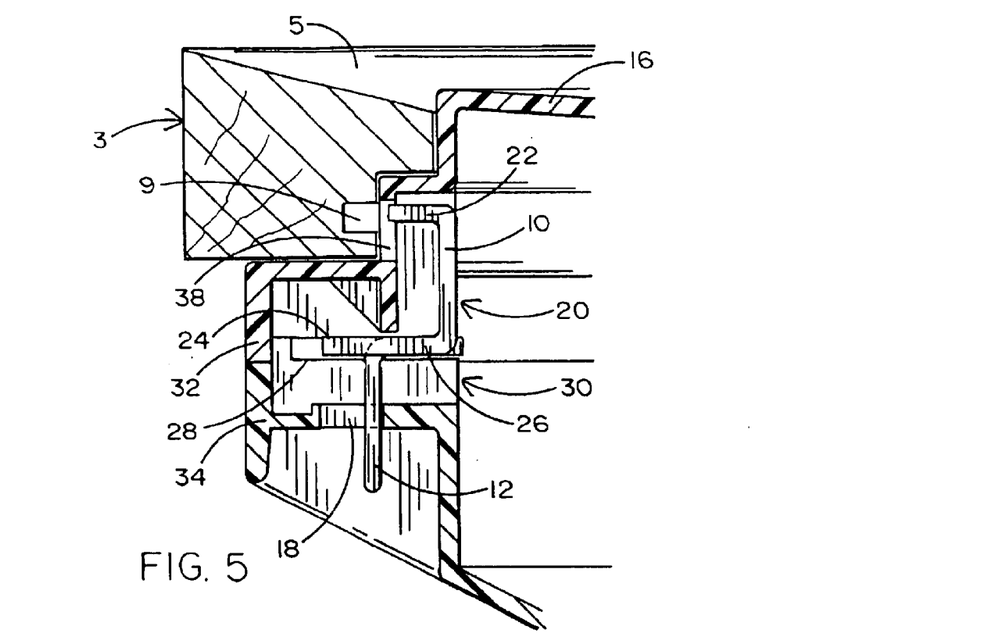
FIG. 5 is a cross-section of the video monitor showing the slidable locking latch of FIG. 4 moved to an unlocked position, whereby the picture frame is detached from the video monitor.
Figure 6:
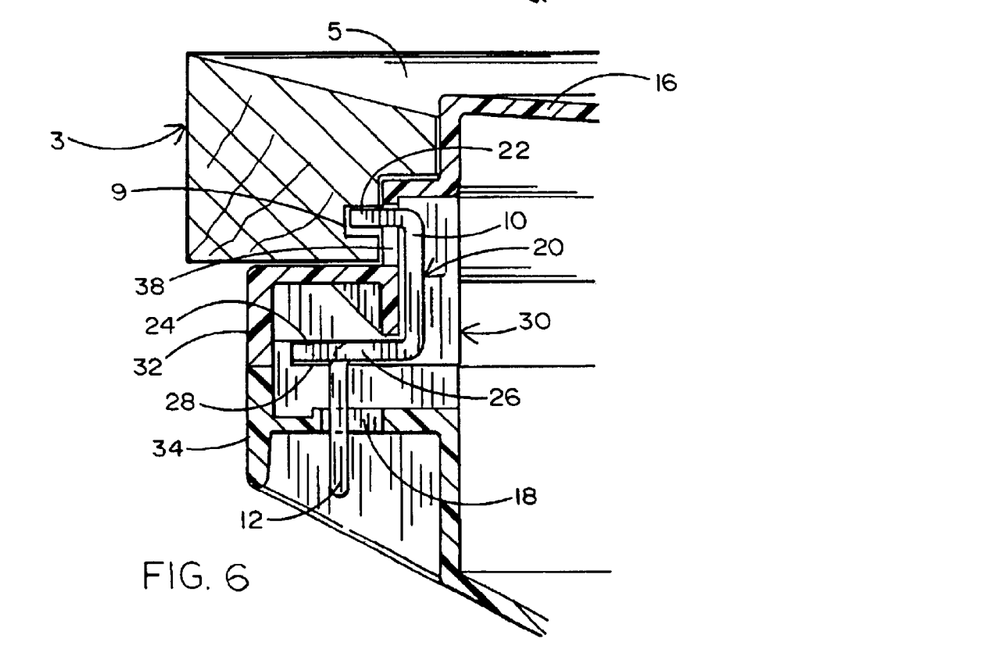
FIG. 6 is a cross-section taken along lines 6—6 of FIG. 3 showing the locking latch of FIG. 4 moved to a locked position, whereby the picture frame is now connected to the video monitor.

FIGS. 5 and 6 of the drawings illustrate one of the pair of slidable locking latches 20 being carried at one side of the hollow shell 30 that encloses the display 2 (of FIGS. 1 and 2) of video monitor 1. Turning first to FIG. 5, the locking latch 20 is shown in the unlocked position such that the locking finger 22 which bends from locking tab 10 is moved out of receipt by the existing peripheral groove 9 that is formed in the border 5 of picture frame 3. In the unlocked position, the push tab 12 of latch 20 is shown projecting outwardly from a first side of the slot 18 that is formed through the rear shell member 34 so as to be manually accessible to receive a pushing force.

Each locking latch 20 is slidable back and forth within the hollow shell 30 of video monitor 1. More particularly, the seat 26 of latch 20 and the sliding arms 24 projecting therefrom are positioned so as to ride along a channel 28 within hollow shell 30. In the unlocked position of FIG. 5, with the locking finger 22 removed from the peripheral groove 9 of frame 3 and the push tab 12 moved to an inboard side of slot 18, the seat 26 of latch 20 will be correspondingly located at the same inboard side of the channel 28.

When it is desirable to lock the picture frame 3 to the video monitor 1 to surround the rectangular picture frame mount 16 and the display 2 and thereby enhance the aesthetic appearance of monitor 1, and turning now to FIG. 6, a pushing force is applied to the push tab 12 of locking latch 20 so as to cause push tab 12 to be relocated to the opposite outboard side of the slot 18. The pushing force is transferred from push tab 12 to the seat 26 of latch 20 to cause seat 26 to slide to the corresponding opposite outboard side of channel 28. Accordingly, the locking finger 22 of locking tab 10 will be moved to the locked position at which to project outwardly through an opening 38 formed in picture frame mount 16 and into receipt by the existing peripheral groove 9 in the border 5 of picture frame 3.

With the pair of locking latches 20 moved to the locked position at opposite sides of the hollow shell 30, the picture frame 3 will be reliably connected to the front of the monitor 1 to lie in surrounding engagement with the picture frame mount 16 that surrounds the digital display 2 that is enclosed by the hollow shell 30. The monitor 1 and frame 3 will remain connected to one another until a pushing force is applied in an opposite direction against the push tabs 12 to cause each locking latch 20 to slide along channel 28 so that the locking finger 22 of locking tab 10 is pulled out of receipt by the peripheral groove 9 of frame 3 and inwardly of the opening 38 of picture frame mount 16 to be relocated from the locked position (of FIG. 6) to the unlocked position (of FIG. 5).

Figure 7:
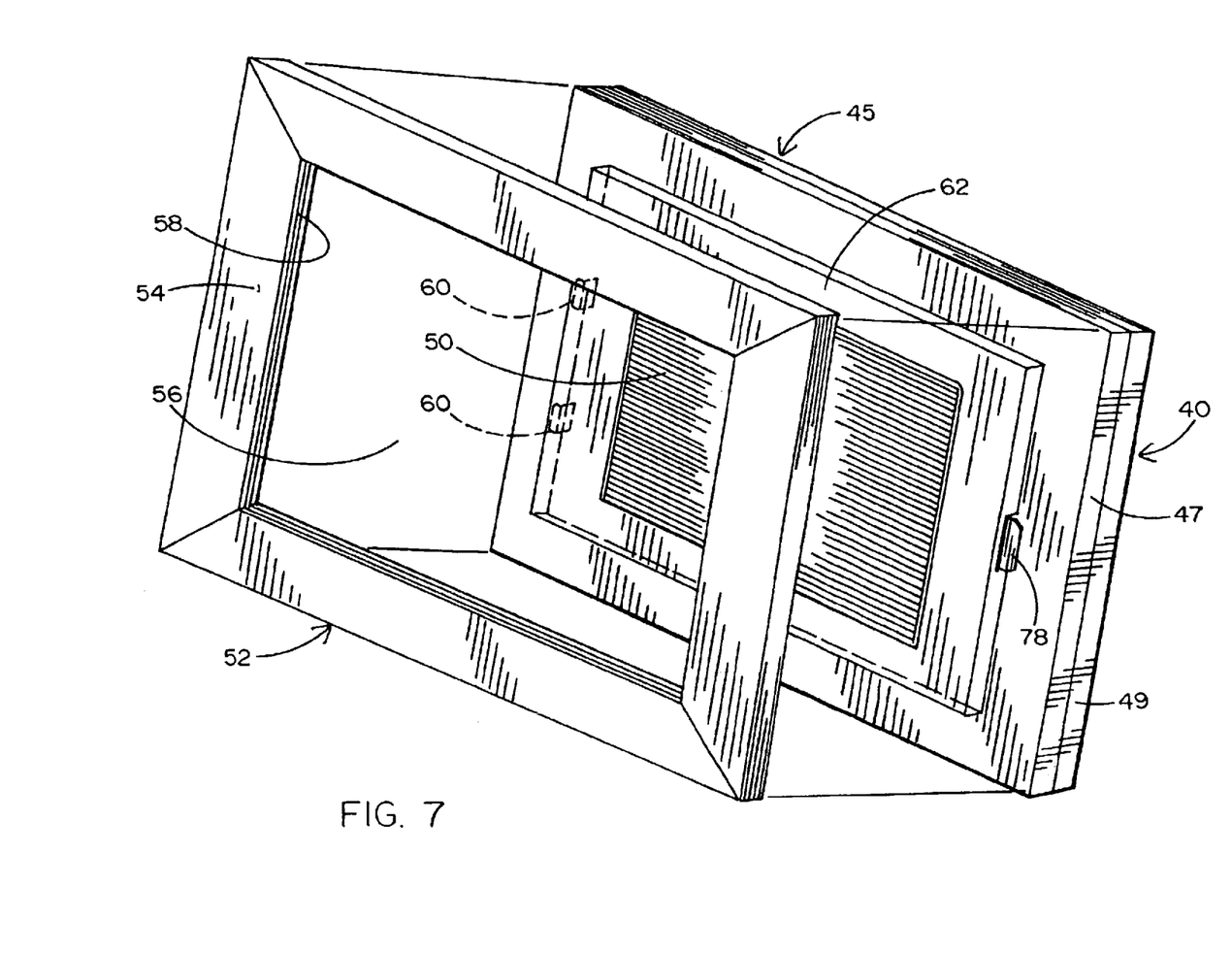
FIG. 7 is an exploded view of a standard picture frame to be detachably connected to the front of a video monitor in accordance with a second embodiment of this invention.

A second embodiment for a video monitor to which a picture frame is detachably connected is now described while referring initially to FIG. 7 of the drawings. The video monitor 40 includes a hollow shell 45 having front and rear shell members 47 and 49 that enclose a commercially available digital display 50. The digital display 50 of FIG. 7 may be identical to the digital display 2 to which reference was made when referring to FIGS. 1–6. For purposes of aesthetics, the digital display 50 of video monitor 40 is surrounded by a frame 52. The frame 52 of FIG. 7 may be identical to the standard picture frame 3 of FIGS. 1–6. Therefore, the picture frame 52 includes an outer (e.g., rectangular) border having a central open area or window 56 through which the display 50 will be visible. Moreover, an existing groove 58 is formed in the border 54 so as to extend around the central window 56.

In the case of FIG. 7, the hollow shell 45 of the video monitor 40 carries a pair of stationary locking tabs 60 that are located at one side of the display 50 and a pivotal locking latch 70 (best shown in FIGS. 8 and 9) that is located at the opposite side of display 50. As will soon be explained, the stationary locking tabs 60 and the pivotal locking latch 70 are received within the existing peripheral groove 58 at opposite sides of picture frame 52, whereby the frame 52 is detachably connected to the front of the video monitor 40 to surround display 50.

A rectangular picture frame mount 62 projects outwardly from the front shell member 47 of the hollow shell 45 so as to surround the display 50 of video monitor 40. The dimensions of picture frame mount 62 are selected to correspond with the dimensions of the central window 56 of picture frame 52 so that the frame can be detachably connected to the front of monitor 40 in surrounding engagement with mount 62. That is, and as will now be explained while referring to FIGS. 8 and 9 of the drawings, the stationary locking tabs 60 and the pivotal locking latch 70 extend outwardly and in opposite directions through the picture frame mount 62 to enable the picture frame 52 to be either connected to or detached from the video monitor 40 depending upon the position of the pivotal locking latch 70 relative to the picture frame.

Figure 8:
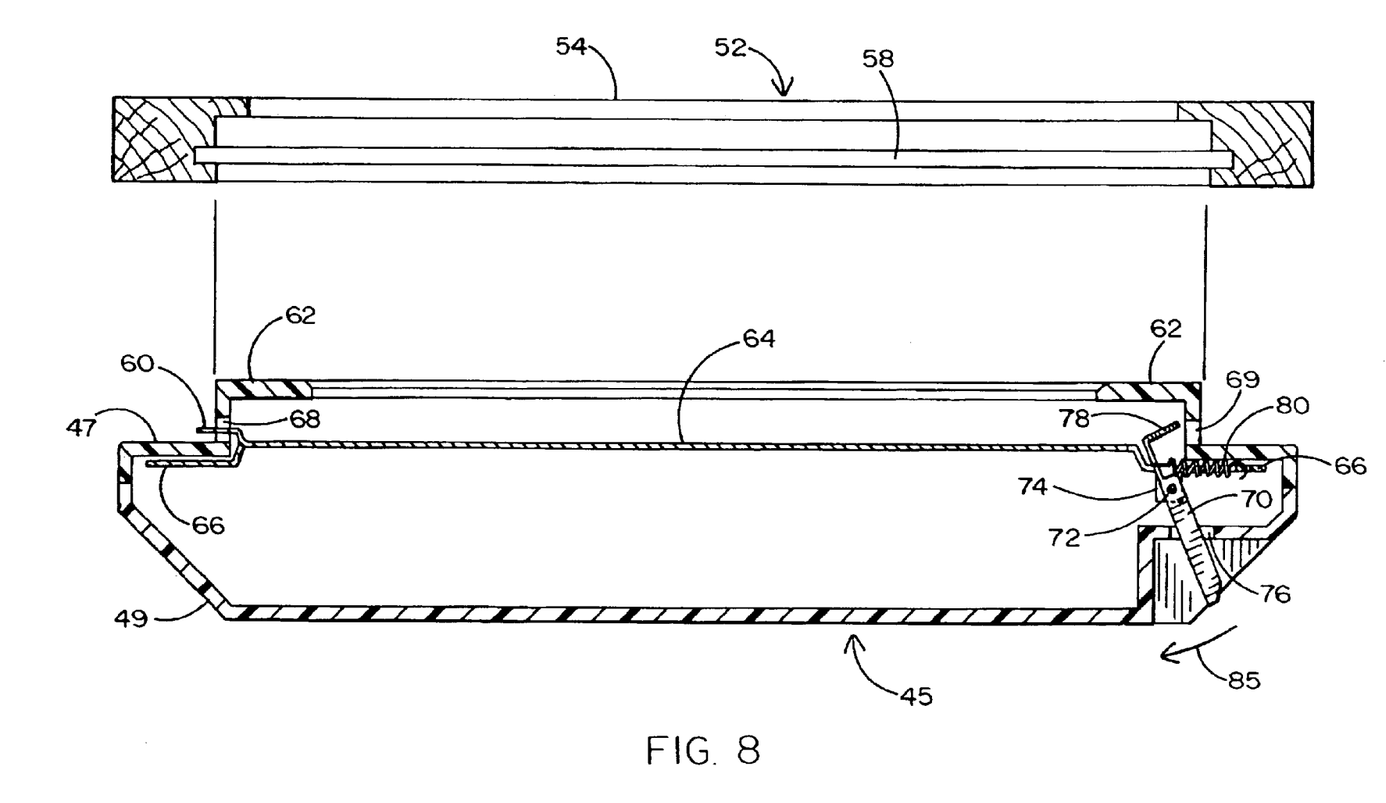
FIG. 8 is a cross-section of the video monitor and picture frame of FIG. 7 detached from one another with a pivotal locking latch rotated to an unlocked position.

FIG. 8 of the drawings shows the locking latch 70 in the unlocked position with the picture frame 52 detached from the hollow shell 45 of the video monitor 40 (of FIG. 7). A flat support plate 64 extends laterally across the hollow shell 45 so as to lie between the front and rear shell member 47 and 49. The support plate 64 functions as a backing to support the display 50 (of FIG. 7) within the hollow shell 45. A peripheral flange 66 which extends around the support plate 64 is seated against the front shell member 47 so that support plate 64 is spaced below the rectangular picture frame mount 62 that projects from the front shell member 47 to surround display 50.

The pair of stationary locking tabs 60 (only one of which being visible in FIG. 7) are punched or cut out from one side of the support plate 64 and bent upwardly therefrom so as to lie above the peripheral flange 66. The stationary locking tabs 60 are aligned to extend from support plate 64 outwardly of the picture frame mount 62 at one side of the hollow shell 45 via respective openings 68 that are formed in the mount 62. Although a pair of locking tabs 60 have been described, it is to be understood that any number of such locking tabs may extend from support plate 64 to project through respective openings 68.

The pivotal locking latch 70 is mounted for rotation within the opposite side of hollow shell 45 on a pivot pin 72 that extends between a pair of opposing detents 74 which bend downwardly from the side of support plate 64 that lies opposite the side at which locking tabs 60 are located. One end of the locking latch 70 is received through a slot 76 that is formed in the rear shell member 49 so that latch 70 will be disposed at a manually accessible location at the back of video monitor 40 to receive a pushing force. The opposite end of locking latch 70 includes a locking finger 78 that is bent by about 90 degrees and aligned for movement through an opening 69 that is formed in the frame mount 62. The opening 69 through frame mount 62 for receipt of locking finger 78 lies opposite the openings 68 through which the locking tabs 60 project. With pivotal locking latch 70 rotated on pivot pin 72 to the unlocked position of FIG. 8, the locking finger 78 of latch 70 is positioned inwardly of opening 69 to permit the picture frame 52 to be connected to the hollow shell 45 of video monitor 40 in surrounding engagement with the rectangular picture frame mount 62 in a manner that will now be described.

Figure 9:
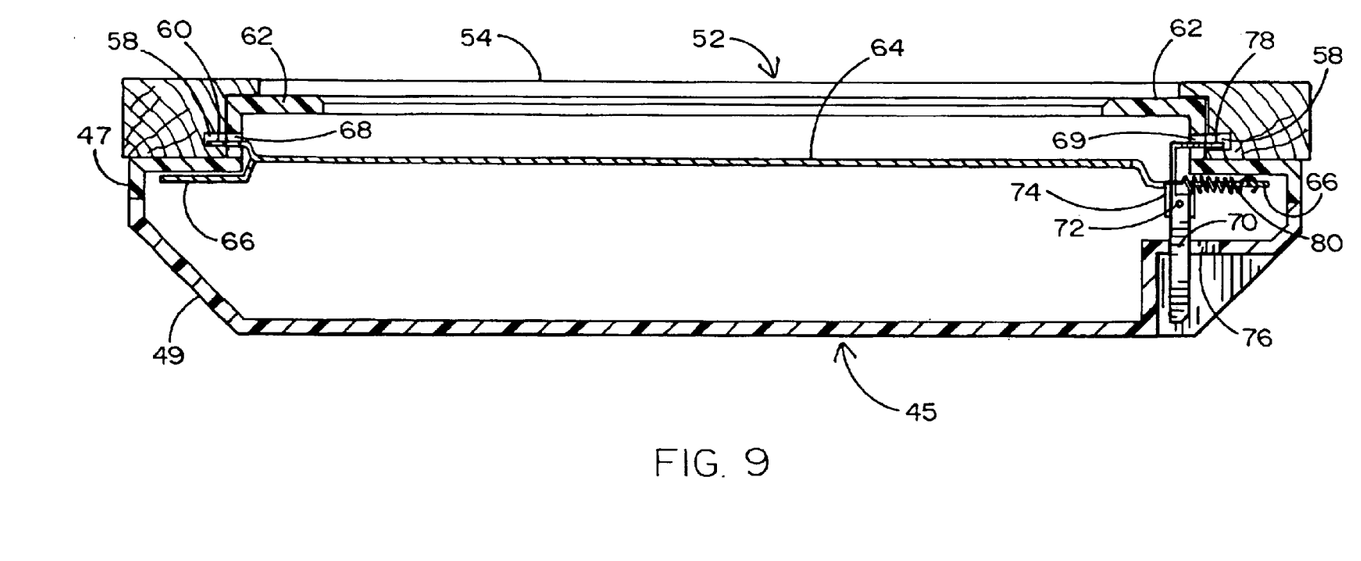
FIG. 9 is a cross-section of the video monitor and picture frame of FIG. 8 connected to one another with the pivotal locking latch rotated to a locked position.

FIG. 9 of the drawings shows the pivotal locking latch 70 rotated to the locked position with the picture frame 52 detachably connected to the hollow shell 45 of video monitor 40 (of FIG. 7) so as to lie in surrounding engagement with the rectangular picture frame mount 62 which surrounds the digital display 50 (of FIG. 7) which is enclosed by shell 45. The picture frame 52 is attached to the hollow shell 45 by first positioning (i.e., tilting) the frame 52 so that the stationary locking tabs 60 that project outwardly through the openings 68 in picture frame mount 62 are received within the existing peripheral groove 58 at one side of frame 52. Next, the picture frame 52 is rotated downwardly around tabs 60 until it is laid flat upon the front shell member 47 of the hollow shell 45 so a to surround the picture frame mount 62 thereof.

At this point, a pushing force is applied to the end of the pivotal locking latch 70 that projects outwardly from the slot 76 in the rear shell member 49. Accordingly, the locking latch 70 will now rotate around its pivot pin 72 (in the direction represented by the reference arrow 85 (in FIG. 8) to the locked position until the locking finger 78 of latch 70 is moved through the opening 69 in the picture frame mount 62 for receipt within the existing peripheral groove 58 at the opposite side of frame 52.

A coil spring 80 is shown connected between the locking latch 70 and the peripheral flange 66 of support plate 64 so that latch 70 will be automatically biased towards the locked position of FIG. 9. That is to say, when locking latch 70 is in the unlocked position of FIG. 8, the spring 80 will be stretched to store energy which acts to pull the locking finger 78 back to the locked position of FIG. 9.

With the stationary locking tabs 60 engaging one side of the picture frame 52 and the locking finger 78 of pivotal locking latch 70 rotated into engagement with the opposite side of picture frame 52, the picture frame 52 will now be reliably connected in surrounding engagement with the picture frame mount 62 of the hollow shell 45 at the front of the video monitor 40 (of FIG. 7) so as to surround the display 50 (of FIG. 7) until a pushing force is applied to locking latch 70 in a direction that is opposite the direction of the reference arrow 85 of FIG. 8. In this case, the locking finger 78 of locking latch 70 will be rotated out of the peripheral groove 58 of picture frame 52 and inwardly of the opening 69 of frame mount 62 so as to be relocated to the unlocked position of FIG. 8 and, thereby, permit the picture frame 52 to be simply lifted off the video monitor 40.

I claim:

1. A video monitor to be connected to a frame having an open window, a border surrounding the open window, and a groove formed in the border, said video monitor comprising:

a display;

a shell within which to enclose said display;

a frame mount extending outwardly from said shell to surround said display, said frame mount having a size and shape to be received within the open window of the frame; and a locking latch slidable through said shell and into receipt by the groove of the frame, whereby the frame is coupled to said shell so as to surround said frame mount and permit said display to be visible through the open window of the frame.

2. The video monitor recited in claim 1, wherein said locking latch has a push tab projecting outwardly from said shell so as to be manually accessible, said push tab receiving a pushing force by which to cause said locking latch to slide through said shell and into receipt by the groove of the frame.

3. The video monitor recited in claim 2, wherein said locking latch also has a locking finger projecting therefrom, said locking finger moving into receipt by the groove of the frame, whereby the frame and the shell are coupled to one another when said pushing force is applied to said push tab to cause said locking latch to slide through said shell.

4. The video monitor recited in claim 3, wherein said frame mount has an opening formed therein, the locking finger of said locking latch moving through the opening in said frame mount for receipt by the groove of the frame for connecting the frame in surrounding engagement with said frame mount when said pushing force is applied to said push tab to cause said locking latch to slide through said shell.

5. The video monitor recited in claim 4, wherein said locking latch has a seat located between said push tab and said locking finger and said shell has a channel formed there within, said seat sliding along said channel in response to said pushing force applied to said push tab for causing said locking finger to correspondingly move through the opening in said frame mounted for receipt by the groove of the frame.

6. The video monitor recited in claim 1, further comprising a pair of said locking latches located at opposite sides of said frame mount and slidable in opposite directions through said shell and into receipt by the groove of the frame, whereby the frame is coupled to said shell.

7. A video monitor to be connected to a frame having an open windows, a border surrounding the open window, and a groove formed in the border, said video monitor comprising:

a display;

a shell within which to enclose said display;

a frame mount extending outwardly from said shell to surround said display, said frame mount having a size and shape to be received within the open window of the frame; and a pivotal locking latch mounted for rotation within said shell, said pivotal locking latch rotating into receipt by the groove of the frame, whereby the frame is coupled to said shell so as to surround said frame mount and permit said display to be visible through the open window of the frame.

8. The video monitor recited in claim 7, wherein said pivotal locking latch has a push tab projecting outwardly from said shell so as to be manually accessible, said push tab receiving a pushing force by which to cause said pivotal locking latch to rotate within said shell and into receipt by the groove of the frame.

9. The video monitor recited in claim 8, wherein said pivotal locking latch also has a locking finger projecting therefrom, said locking finger moving into receipt by the groove of the frame, whereby the frame and the shell are coupled to one another when said pushing force is applied to said push tab to cause said locking latch to rotate within said shell.

10. The video monitor recited in claim 9, wherein said frame mount has an opening formed therein, the locking finger of said pivotal locking latch moving through the opening in said frame mount for receipt by the groove of the frame for connecting the frame in surrounding engagement with said frame mount when said pushing force is applied to said push tab to cause said pivotal locking latch to rotate within said shell.

11. The video monitor recited in claim 10, further comprising a display support plate extending laterally across said shell so as to lie below said frame mount to support said display within said shell and a pivot pin connected to said display support plate, said pivotal locking latch mounted on said pivot pin and rotatable relative to said display support plate in response to said pushing force applied to said push tab.

12. The video monitor recited in claim 11, further comprising a spring connected to said pivotal locking latch, said spring generating a pulling force for causing said pivotal locking latch to rotate within said shell and towards the groove of the frame.

13. The video monitor recited in claim 11, further comprising at least one locking tab projecting from said display support plate, said frame mount having a second opening formed therein, and said locking tab projecting from said display support plate and outwardly through said second opening in said frame mount for receipt by the groove of the frame for connecting the frame in surrounding engagement with said frame mount.

14. The video monitor recited in claim 11, further comprising at least one locking tab located within said shell and projecting outwardly therefrom through one side of said frame mount for receipt by the groove of the frame, said pivotal locking latch rotating within said shell and projecting outwardly therefrom through the opposite side of said frame mount for receipt by the groove of the frame, whereby said frame is connected in surrounding engagement to said frame mount.

* * * * *